US006534158B2

(12) United States Patent
Huang et al.

(10) Patent No.: US 6,534,158 B2
(45) Date of Patent: Mar. 18, 2003

(54) COLOR SHIFTING FILM WITH PATTERNED FLUORESCENT AND NON-FLUORESCENT COLORANTS

(75) Inventors: Peng Huang, Shanghai (CN); Hong Ji, Shanghai (CN); Yaoqi J. Liu, Maplewood, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 167 days.

(21) Appl. No.: 09/788,012

(22) Filed: Feb. 16, 2001

(65) Prior Publication Data

US 2002/0112384 A1 Aug. 22, 2002

(51) Int. Cl.[7] .............................. B32B 3/00; B32B 3/10; B32B 5/00; B32B 7/00

(52) U.S. Cl. ........................ 428/201; 428/195; 428/203; 428/204; 428/206; 428/207; 428/212; 428/916; 40/442; 359/1; 359/2; 359/502; 359/580; 359/589; 359/590; 359/485; 359/487; 359/488; 359/494; 359/839

(58) Field of Search ................................ 428/195, 201, 428/203, 204, 206, 207, 212, 916; 359/1, 2, 502, 580, 589, 590, 838, 839, 485, 486, 488, 494; 40/900, 442

(56) References Cited

U.S. PATENT DOCUMENTS

| | | | | |
|---|---|---|---|---|
| 540,768 A | | 6/1895 | Western | |
| 3,124,639 A | | 3/1964 | Kahn | 88/65 |
| 3,610,729 A | | 10/1971 | Rogers | 350/157 |
| 3,711,176 A | | 1/1973 | Alfrey, Jr. et al. | 350/1 |
| 3,801,429 A | | 4/1974 | Schrenk et al. | 161/181 |
| 3,860,036 A | | 1/1975 | Newman, Jr. | 138/45 |
| 4,015,131 A | * | 3/1977 | McDonough et al. | 106/31.15 |
| 4,162,343 A | | 7/1979 | Wilcox et al. | 428/212 |
| 4,310,584 A | | 1/1982 | Cooper et al. | 428/212 |
| 4,446,305 A | | 5/1984 | Rogers et al. | 528/348 |
| 4,455,039 A | * | 6/1984 | Weitzen et al. | 283/58 |

(List continued on next page.)

FOREIGN PATENT DOCUMENTS

| | | | | |
|---|---|---|---|---|
| EP | 0 657 297 | | 6/1995 | |
| GB | 1 536 403 | * | 12/1978 | |
| WO | WO 95/27919 | | 4/1995 | G02B/27/28 |
| WO | WO 95/17303 | | 6/1995 | B32B/7/02 |
| WO | WO 95/17691 | | 6/1995 | G02B/5/30 |
| WO | WO 95/17692 | | 6/1995 | G02B/5/30 |
| WO | WO 95/17699 | | 6/1995 | G02F/1/1335 |
| WO | WO 97/01440 | | 1/1997 | B32B/27/36 |
| WO | WO 97/01774 | | 1/1997 | G02B/1/10 |
| WO | WO 97/37252 | * | 10/1997 | |
| WO | WO 99/36248 | | 7/1999 | B29C/47/70 |
| WO | WO 99/36258 | | 7/1999 | B32B/7/02 |
| WO | WO 99/36262 | | 7/1999 | B32B/27/00 |
| WO | WO 00/24580 | | 5/2000 | |

OTHER PUBLICATIONS

Schrenk et al., Nanolayer polymeric optical films, Tappi Journal, pp. 169–174, Jun., 1992.

Weber et al., “Giant Birefringent Optics in Multilayer Polymer Mirrors”, Science, vol. 287, Mar. 31, 2000, pp. 2451–2456.

*Primary Examiner*—Vivian Chen
(74) *Attorney, Agent, or Firm*—Stephen C. Jensen

(57) ABSTRACT

Disclosed are articles having a color shifting film and indicia located behind the color shifting film. The indicia include at least a first and second colored portion, the first portion including a first fluorescent colorant. The second colored portion is non-fluorescent but has a color similar to that of the first portion to enhance concealment of the indicia under certain viewing conditions. At least one of the colored portions is patterned.

16 Claims, 6 Drawing Sheets

U.S. PATENT DOCUMENTS

| | | | | | |
|---|---|---|---|---|---|
| 4,520,189 | A | | 5/1985 | Rogers et al. | 528/331 |
| 4,521,588 | A | | 6/1985 | Rogers et al. | 528/363 |
| 4,525,413 | A | | 6/1985 | Rogers et al. | 428/212 |
| 4,652,464 | A | | 3/1987 | Ludlum et al. | 40/442 X |
| 4,720,426 | A | | 1/1988 | Englert et al. | 428/344 |
| 5,103,337 | A | | 4/1992 | Schrenk et al. | 359/359 |
| 5,188,760 | A | | 2/1993 | Hikmet et al. | 252/299.01 |
| 5,211,878 | A | | 5/1993 | Reiffenrath et al. | 252/299.63 |
| 5,235,443 | A | | 8/1993 | Barnik et al. | 359/37 |
| 5,269,995 | A | | 12/1993 | Ramanathan et al. | 264/171 |
| 5,294,657 | A | | 3/1994 | Melendy et al. | 524/270 |
| RE34,605 | E | | 5/1994 | Schrenk et al. | 359/359 |
| 5,316,703 | A | | 5/1994 | Schrenk | 264/1.3 |
| 5,319,478 | A | | 6/1994 | Fijnfschiiling et al. | 359/53 |
| 5,360,659 | A | | 11/1994 | Arends et al. | 428/216 |
| 5,389,324 | A | | 2/1995 | Lewis et al. | 264/171 |
| 5,440,446 | A | | 8/1995 | Shaw et al. | |
| 5,448,404 | A | | 9/1995 | Schrenk et al. | 359/584 |
| 5,486,935 | A | | 1/1996 | Kalmanash | 359/37 |
| 5,486,949 | A | | 1/1996 | Schrenk et al. | 359/498 |
| 5,612,820 | A | | 3/1997 | Schrenk et al. | 359/498 |
| 5,629,055 | A | | 5/1997 | Revol et al. | 428/1 |
| 5,656,360 | A | | 8/1997 | Faykish et al. | |
| 5,686,979 | A | | 11/1997 | Weber et al. | 349/96 |
| 5,699,188 | A | | 12/1997 | Gilbert et al. | 359/584 |
| 5,700,077 | A | | 12/1997 | Dreyer, Jr. et al. | |
| 5,721,603 | A | | 2/1998 | De Vaan et al. | 349/194 |
| 5,744,534 | A | | 4/1998 | Ishiharada et al. | 524/442 |
| 5,751,388 | A | | 5/1998 | Larson | 349/96 |
| 5,767,935 | A | | 6/1998 | Ueda et al. | 349/112 |
| 5,770,306 | A | | 6/1998 | Suzuki et al. | 428/328 |
| 5,783,120 | A | | 7/1998 | Ouderkirk et al. | 264/134 |
| 5,793,456 | A | | 8/1998 | Broer et al. | 349/98 |
| 5,808,794 | A | | 9/1998 | Weber et al. | 359/487 |
| 5,825,542 | A | | 10/1998 | Cobb, Jr. et al. | 359/487 |
| 5,825,543 | A | | 10/1998 | Ouderkirk et al. | 359/494 |
| 5,877,895 | A | | 3/1999 | Shaw et al. | |
| 5,881,196 | A | * | 3/1999 | Phillips | 385/127 |
| 5,882,774 | A | | 3/1999 | Jonza et al. | 428/212 |
| 5,940,149 | A | | 8/1999 | Vanderwerf | 349/5 |
| 5,962,114 | A | | 10/1999 | Jonza et al. | 428/212 |
| 5,965,247 | A | | 10/1999 | Jonza et al. | 428/212 |
| 6,010,751 | A | | 1/2000 | Shaw et al. | |
| 6,024,455 | A | | 2/2000 | O'Neill et al. | |
| 6,045,894 | A | | 4/2000 | Jonza et al. | |

* cited by examiner

COLOR SHIFTING FILM WITH PATTERNED FLUORESCENT AND NON-FLUORESCENT COLORANTS

FIELD OF THE INVENTION

The present invention relates generally to films and other articles that incorporate information whose appearance is highly dependent upon viewing angle.

BACKGROUND OF THE INVENTION

Films that incorporate directional images—images that are viewable at some viewing geometries and not others—are generally known. U.S. Pat. 6,024,455 (O' Neill et al.), for example, discloses reflective articles in which a multilayer film covers a patterned retroreflective layer. The patterned retroreflective layer can include an indicia layer having patterned regions comprising conventional inks, dyes, or other substances which are substantially opaque to some wavelengths but transparent to others. Such films, however, require specialized lighting arrangements for optimal viewing.

PCT Publication WO 99/36258 (Weber et al.) discloses, among other things, color shifting films with printed indicia, and optical brighteners such as dyes that absorb in the UV and fluoresce in the visible region of the color spectrum. Such articles can also provide images whose appearance changes with viewing geometry, particularly where the printed indicia is provided on a back side of the color shifting film with respect to an observer. Advantageously, such articles can be viewed under ordinary diffuse lighting conditions, such as in a typical office environment.

BRIEF SUMMARY

Close inspection of articles incorporating color shifting film and fluorescent indicia as described above has revealed a difficulty in satisfactorily concealing the fluorescent indicia from view. Articles having improved concealment of the fluorescent indicia are disclosed herein.

In disclosed embodiments, the article includes a color shifting film and indicia disposed behind the color shifting film from the point of view of an ordinary observer of the article. The indicia include a first and second colored portion arranged as a foreground and a background of the indicia. The first colored portion comprises a fluorescent colorant, and the second colored portion is substantially non-fluorescent. The second colored portion is selected to have substantially the same color as the first colored portion to enhance concealment of the indicia. Preferably, the first and second colored portions have the same color when viewed by themselves apart from the color shifting film, and also have the same apparent color when viewed through the color shifting film at an angle at which the color shifting film substantially blocks transmission of an emission band of the fluorescent colorant. In this way, the contrast between foreground and background is substantially reduced, and the indicia become less noticeable at such a viewing angle.

BRIEF DESCRIPTION OF THE DRAWINGS

In the figures, like reference numerals indicate like elements.

DETAILED DESCRIPTION OF THE ILLUSTRATIVE EMBODIMENTS

Figure 1:
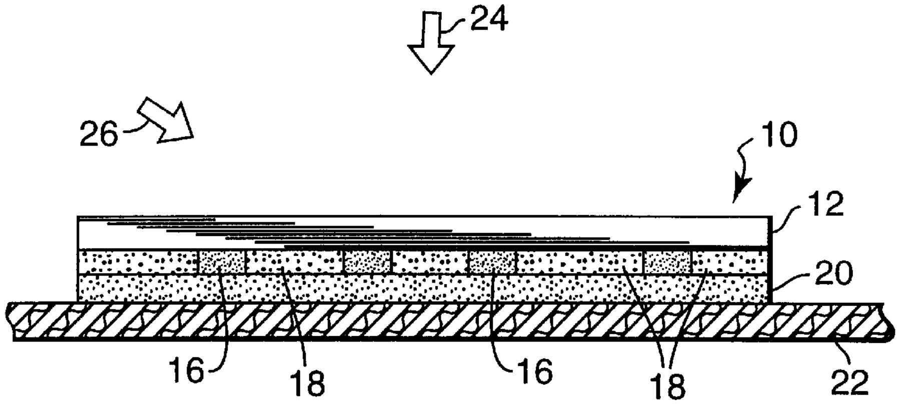
FIG. 1 is a sectional view of an article having a color shifting film and a first and second colored portion disposed behind the film which form indicia, the article being adhered to a substrate.

In FIG. 1, an article 10 includes a color shifting film 12 and indicia 14 (see FIG. 2) disposed behind the film 12 and viewable through the film 12 for at least some viewing and/or illumination geometries. The indicia 14 is made up of or defined by at least a first colored portion 16 and a second colored portion 18. As shown best in FIGS. 1 and 2, portions 16,18 are patterned in complementary fashion so as to define the indicia 14, which in this embodiment is a single letter "W". Note that FIG. 1 corresponds roughly to a sectional view taken along axis 1- 1 in FIG. 2, which is drawn to a somewhat smaller scale than FIG. 1. Article 10 also includes an optional adhesive layer 20, which preferably comprises a conventional pressure-sensitive adhesive (PSA), but alternatively can comprise a heat-activated adhesive or other suitable adhesive. Adhesive layer 20 secures the article 10 to an optional substrate 22. If desired, substrate 22 can form part of the article 10. Depending upon the intended use of the article 10, substrate 22 can itself comprise a wide variety of different articles, such as a document, sheet of paper, rigid or flexible sign backing, or rigid or flexible window material if some illumination is desired from the back of article 10. To the extent any light is transmitted through the combination of color shifting film 12 and indicia 14, such light can be absorbed, reflected diffusely or specularly, or transmitted by substrate 22.

The color shifting film 12 has the property of transmitting different wavelengths of light as a function of the angle such light impinges on the film. The transmission properties may also be polarization dependent, even at normal incidence. In this regard, film 12 can be a polarizer, a mirror, or a mirror having substantial polarizing properties. Preferred films 12 have a multitude of alternating polymer layers arranged into a multitude of unit cells, each unit cell effective to reflect light at a wavelength twice the optical thickness of such unit cell. Such films can be made by co-extrusion of two or more polymers forming an interleaved stream of materials. The cast coextruded film can be subsequently thinned and oriented by stretching uniaxially or biaxially to form a finished reflective polarizer or mirror. Preferably, at least one of the polymers is capable of strain-induced birefringence so that the indices of refraction change on stretching. The unit cells, which can each include two, three, or more individual polymer layers, are typically also arranged to have an optical thickness gradient across the thickness of the film 12 so that a relatively wide spectral band ("reflection band") is reflected by the film. Boundaries of the reflection band are referred to herein as band edges— spectral transitions from high reflectivity (low transmission) to low reflectivity (high transmission) or vice versa. It is also known to tailor the thickness profile of the unit cells to sharpen the band edges. These and other aspects of suitable color shifting films are described in one or more of U.S. Pat. No. 5,882,774 (Jonza et al.); U.S. Pat. No. 6,024,455 (O' Neill et al.); and U.S. patent application Ser. No. 09/006,591 entitled "Color Shifting Film" (Weber et al.), filed Jan. 13, 1998. Reference is also made to U.S. Pat. No. 5,103,337 (Schrenk et al.) (reissued as Re. 34,605) and U.S. Pat. No. 5,360,659 (Arends et al.) for discussions of unit cells having more than two individual layers and/or more than two unique polymer materials.

Conventional inorganic multilayer films-made for example by vacuum deposition of two inorganic dielectric materials sequentially in a multitude of layers on a glass or other suitable substrate, or alternating layers of inorganic materials and organic polymers (see, e.g., U.S. Pat. No. 5,440,446 (Shaw et al.), U.S. Pat. No. 5,877,895 (Shaw et al.), and U.S. Pat. No. 6,010,751 (Shaw et al.))— can also be used as the color shifting film 12. Compared to these alternative multilayer films, preferred polymeric films described in the preceding paragraph have the added benefit of being able to maintain the integrity of their band edges over substantially all incidence angles and regardless of polarization of light, by controlling the out-of-plane (z-index) index of refraction of adjacent layers within the film. Preferably, the difference$\Delta n_z$ in index of refraction along the z-axis of adjacent polymer layers within a unit cell is less than the maximum index difference in the plane of the film (i.e., $\Delta n_x$ or$\Delta n_y$) between such adjacent layers, more preferably less than 0.5 or 0.2 times such maximum in-plane index difference, and can also preferably be substantially zero. These conditions help maintain the shape of the band edge even as the reflection band shifts in wavelength or color with changing incidence angle, which corresponds visually to high color saturation over a wide range of incidence angles. Suitable films are available from 3M Company (St. Paul, Minn, USA) under the designation 3M™ Radiant Light Film.

Coextruded polymeric films whose layers are not oriented, and thus are substantially isotropic in refractive index, can also be used for the color shifting film. Such films are described, for example, in U.S. Pat. No. 3,801,429 (Schrenk et al.), U.S. Pat. No. 4,162,343 (Wilcox et al.), and U.S. No. Pat. 4,310,584 (Cooper et al.).

Figure 2:
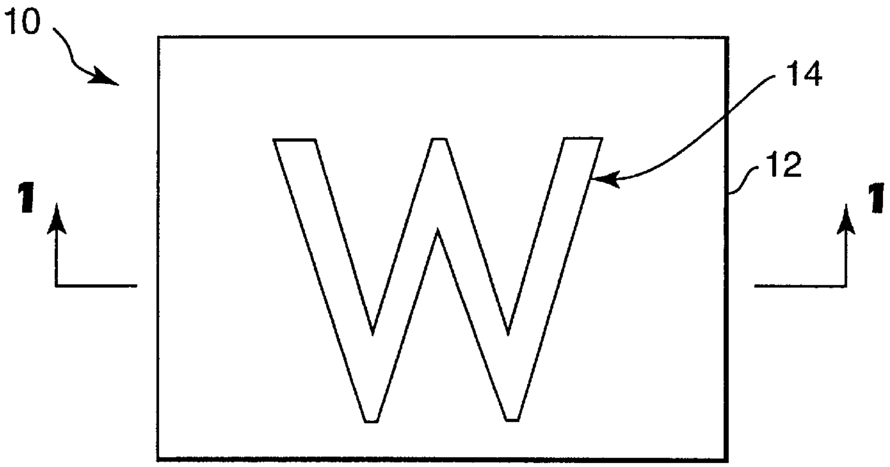
FIG. 2 is a front view of the article of FIG. 1 from one viewing angle.
Figure 3:
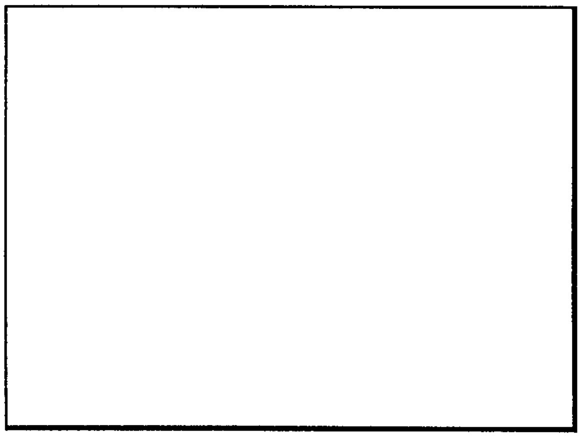
FIG. 3 is a front view of the article of FIG. 1 from another viewing angle.

The first colored portion 16 is patterned to form the foreground of a letter "W", and is disposed behind color shifting film 12. Other letters, symbols, or shapes which convey information are also contemplated. Importantly, portion 16 includes a fluorescent colorant. The term "colorant" as used herein means any pigment, dye, or other substance or combination of substances used to impart hue or chroma to an article. The term "fluorescent" refers to the property of emitting light at one wavelength (or band of wavelengths) as a result of the absorption of light at a different (and typically shorter) wavelength (or band of wavelengths). The wavelength range of emitted fluorescent light is referred to as an emission band; that of the absorbed light is referred to as an excitation band. By proper selection of fluorescent colorant and color shifting film, light in the emission band can be substantially transmitted through the color shifting film at some angles, but substantially reflected by the color shifting film (and therefore blocked from reaching the eye of an observer) at other angles. Additionally or alternatively, if a highly directional light source is used, light in the excitation band can be blocked from reaching the fluorescent colorant at some angles but transmitted to the fluorescent colorant at other angles. Arrows 24,26 shown in FIG. 1 represent a normal-incidence viewing angle and an oblique viewing angle respectively. At one of these angles, color shifting film 12 transmits the fluorescent emission of first colored portion 16, yielding a bright "W"(FIG. 2). At the other angle, color shifting film 12 substantially blocks light in the emission band so that the "W" is relatively dark (FIG. 3).

The preceding discussion of course assumes that the fluorescent colorant in colored portion 16 is able to be excited by absorption of light in the excitation band. Such excitation can be achieved in a number of ways depending upon the intended application.

In some applications no significant amount of light is generated from behind the article 10. In those cases excitation light passes through the color shifting film 12 before reaching first colored portion 16. Some color shifting films 12 can effectively transmit the excitation light only for some directions of incidence and/or only for some polarizations. Such selective transmission of excitation light can be used in a specialized procedure to interrogate the article: one light beam having the appropriate angular and/or polarization properties is alternated with another light beam not having those properties, and the visual response (fluorescent emission or lack thereof at a suitable observation angle) is monitored. Alternatively, the application may be one in which the article 10 is exposed to light impinging on its front surface from substantially all angles and polarizations—such as is found in typical office environments—in which case a sufficient amount of light in the excitation band, and having the appropriate angular and/or polarization properties, will be present to produce fluorescence in the portion 16. Other color shifting films 12 can effectively transmit excitation light for substantially all or at least a wide range of incidence angles and/or polarizations. For those films, a comparatively greater amount of ambient light will pass through the color shifting film to produce a brighter fluorescent emission.

In some applications a source of light, such as a backlight or other lamp, is employed behind the article 10. In those cases any materials or elements disposed behind portion 16 are simply selected to have an aggregate transmission for light in the excitation band sufficient to produce the desired fluorescent effect in portion 16.

Article 10 also includes second colored portion 18 disposed behind color shifting film 12. As shown in FIG. 1, portion 18 can be patterned in a complementary fashion to portion 16. Alternatively, for simplicity of manufacturing, only one of portions 16,18 can be patterned, and the other portion can be unpatterned. In that case the unpatterned portion can for instance be printed in a continuous layer to cover the patterned portion in some places and to extend between parts of the patterned portion in other places. In another manufacturing approach, the patterned portion can be printed on top of the continuous unpatterned portion and the resulting combination laminated to or otherwise placed behind color shifting film 12. In still another approach the patterned portion can be printed to the back side of the color shifting film, and the unpatterned portion can simply be positioned behind that combination. Conventional coating processes can be used to apply the colored portion(s) to the film 12, including without limitation flexographic printing techniques.

If the article includes an unpatterned adhesive layer 20, such layer can replace the first or second colored portions 16,18 by inclusion of fluorescent and/or non-fluorescent colorants as appropriate.

As shown in FIGS. 1 and 2, portion 18 forms a background for the indicia. Importantly, portion 18 is substantially non-fluorescent. That is, portion 18 does not produce fluorescent emission noticeable to an ordinary observer when exposed to expected light levels for the particular application. Furthermore, the pigments, dyes, inks, or other colorants within portion 18 are selected to yield a perceived color that is substantially the same as the color of colored portion 16. Such selection helps reduce the contrast between the foreground and background of the indicia at some viewing angles, thus helping conceal the indicia (see FIG. 3) at such angles compared to constructions having no colored portion 18 or having fluorescent indicia printed onto a white surface or a surface of a different color.

Preferably, the color of portions 16,18 are substantially the same when viewed from the front side of color shifting film 12 at an angle at which the color shifting film 12 blocks fluorescent emission from reaching the eye of the observer. Under those conditions, portion 16 will appear relatively dark compared to viewing angles where the bright fluorescent emission is visible. To the extent non-fluorescent colorants are also present in portion 16, they may contribute to its appearance or color under the stated conditions.

If both portions 16, 18 are disposed behind color shifting film 12, it is preferred to select colors for portions 16,18 that are also substantially the same (even though their relative brightness may differ substantially) if viewed through a clear transparent medium (such color referred to as "inherent color"), e.g. if viewed from behind color shifting film 12, or if viewed through a clear film substituted for the color shifting film 12, or if viewed from above after coating the portions side by side onto a different substrate. For example, both portions can be essentially orange and portion 16 can include an orange fluorescent colorant. As another example, both portions can be essentially green and portion 16 can include a green fluorescent colorant. If the portions are colored in this way, their appearance will typically also be very similar when viewed through the color shifting film at an angle at which the color shifting film blocks the fluorescent emission, to help conceal the indicia at such angles.

If desired, the role of foreground and background can be reversed: portion 16 can form the background and portion 18 can form the foreground of the indicia. Since fluorescent colorants tend to be more expensive than non-fluorescent colorants, it is desirable to use a smaller quantity of portion 16 than of portion 18. In many cases the foreground of particular indicia takes up less area than the background. Thus, in many cases it is preferred that portion 16 be used as the foreground of the indicia.

Portion 16, even if it includes a brightly colored fluorescent pigment, will in many cases appear relatively dark in certain geometries—such as an observation angle at which the color shifting film 12 substantially blocks the fluorescent emission, or where the color shifting film substantially blocks light in the excitation band from a directional light source. In such cases portion 18 may well be designed to have an inherent color such as dark brown or black that is substantially different than the inherent color of portion 16, which may for example be green, orange, or red. Yet, the portions 16, 18 can still have a similar apparent color when viewed from the front of film 12 at the certain geometries referred to, thus helping conceal the indicia. Indeed, portion 18 may then be positioned either behind or in front of film 12. In each case the indicia 14 would still be considered to be behind film 12 since at least one of the portions making it up is behind film 12.

Figure 4:
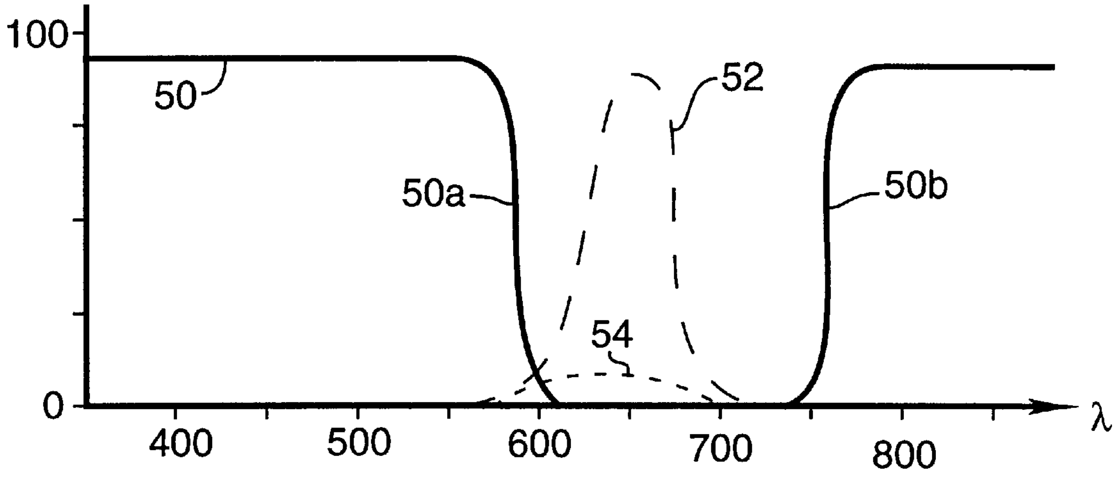
FIG. 4 is an idealized and simplified composite graph depicting spectral properties of the first and second colored portions, and of the color shifting film at one viewing angle.
Figure 5:
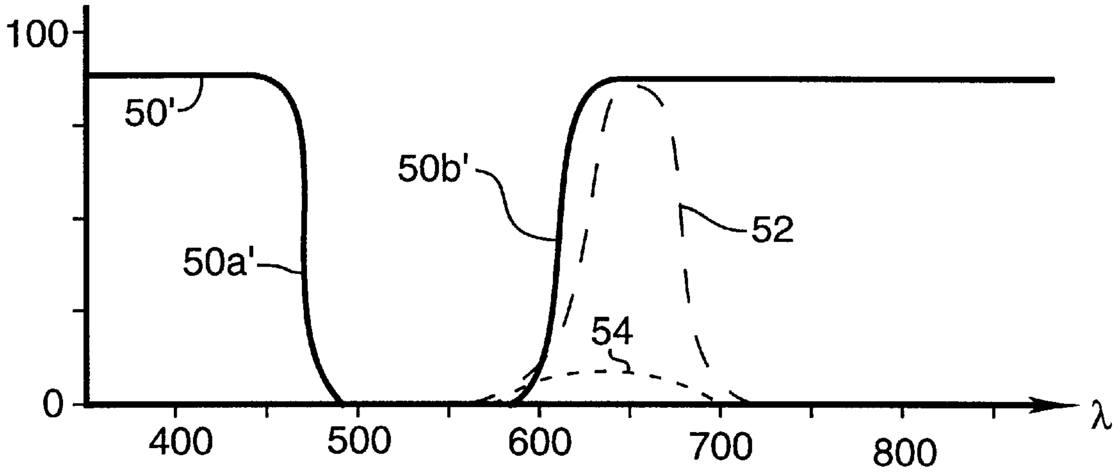
FIG. 5 is an idealized and simplified composite graph depicting spectral properties of the first and second colored portions, and of the color shifting film at another viewing angle.

FIGS. 4 & 5 are idealized, simplified composite graphs that depict spectral properties of the first and second colored portions, and of the color shifting film for a particular embodiment. For all curves shown, the x-axis represents the wavelength of light$\lambda$ in nanometers (nm), with the visible region extending roughly from 400 to 700 nm. Curve 50 (FIG. 4) represents the spectral transmission of color shifting film 12 at normal incidence, and curve 50' (FIG. 5) represents its transmission at an oblique angle of incidence. These curves may be for a particular polarization of light, or instead an average over all polarizations. For these curves, the y-axis represents percent transmission, from 0% to 100%. If the color shifting film 12 comprises the preferred polymeric multilayer films described above, then the specular reflectivity at a particular wavelength is substantially 100% minus the percent transmission, since absorption in the films is typically much less than 1% for most wavelengths of interest. Curves 52 and 54 represent the effective reflectivity (reflectivity plus fluorescent intensity, if any) of colored portions 16, 18 respectively, measured by themselves in the absence of any color shifting film. For curves 52,54, the y-axis represents effective reflectivity in arbitrary units. Curves 52,54 are roughly to scale with respect to each other, insofar as the portion 16 having the fluorescent colorant is much brighter at certain wavelengths than the other portion 18. However, the relative heights of the curves are not intended to be exact, and all curves are idealized for ease of discussion.

At normal incidence (FIG. 4), the color shifting film 12 has a low transmission in a reflectance band bounded by band edges 50*a*, 50*b* as shown. Outside the reflectance band, the film has high transmission. At this geometry, film 12 substantially blocks light associated with colored portions 16,18, except near one side of curves 52,54. The small amount of light that is transmitted has a similar apparent color and intensity, and the result is a low contrast appearance as depicted in FIG. 3.

At a high angle of incidence (FIG. 5), the reflectance band and associated band edges, now labeled 50*a* ' and 50*b* ', have shifted to shorter wavelengths—hence the term color shifting film to describe the accompanying shift in transmitted light. At this geometry, light from both colored portions 16,18 is substantially transmitted by the film 12. The high brightness of the fluorescent colorant in portion 16 however overpowers any reflectance from portion 18, which thus appears dark in comparison. The result is a high contrast appearance as depicted in FIG. 2.

Figure 6:
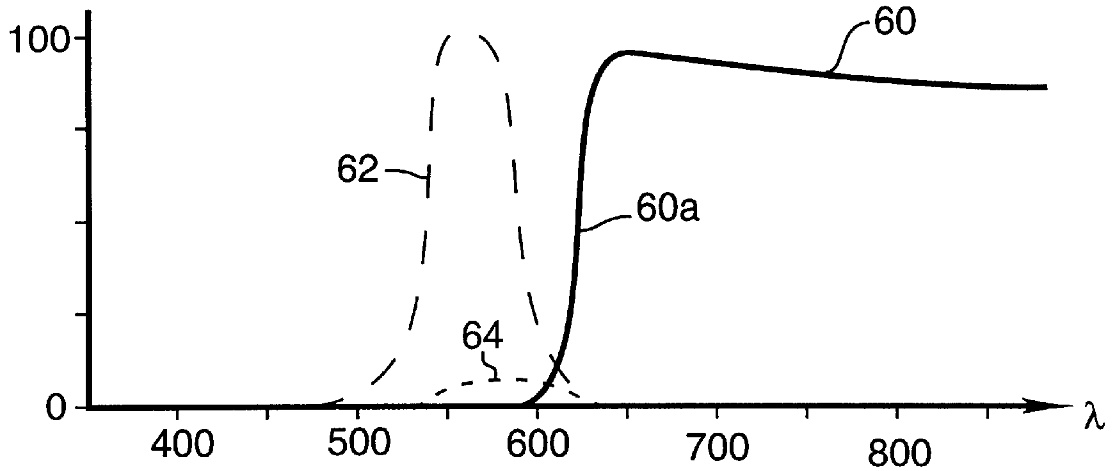
FIG. 6 is an idealized and simplified composite graph depicting, for another embodiment, spectral properties of the first and second colored portions, and of the color shifting film at one viewing angle.

FIG. 6 is an idealized, simplified composite graph for normal incidence similar to FIG. 4, but for a different embodiment having different first and second colored portions 16,18, and a different color shifting film 12. Curve 60 represents the spectral transmission of color shifting film 12 at normal incidence. Curve 60 includes band edge 60*a*. Curves 62,64 represent the effective reflectivity (as discussed above) of colored portions 16, 18 respectively. The overall spectral distributions of curves 62,64 represent similar colors. Furthermore, at normal incidence the film 12 substantially blocks light associated with colored portions 16,18, except near one side of curves 62,64. The small amount of light that is transmitted has a similar apparent color and intensity, and the result is a low contrast appearance as depicted in FIG. 3.

For oblique angle observation, curve 60 with band edge 60*a* is replaced with a similar curve (not shown) shifted to shorter wavelengths by an amount dictated by the angle of observation. At at least some angles, the shifted transmission curve substantially transmits light from curves 62,64 to yield a high contrast appearance with a bright foreground colored portion 16 as depicted in FIG. 2.

Figure 7:
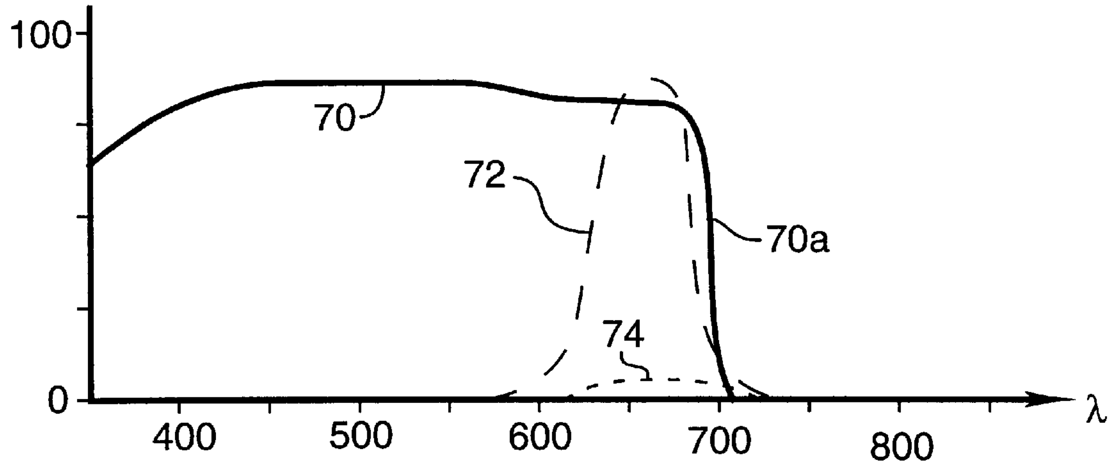
FIG. 7 is an idealized and simplified composite graph depicting, for still another embodiment, spectral properties of the first and second colored portions, and of the color shifting film at one viewing angle.

FIG. 7 is an idealized, simplified composite graph for normal incidence similar to FIG. 6, but for still another embodiment having different first and second colored portions 16,18, and a different color shifting film 12. Curve 70 represents the spectral transmission of color shifting film 12 at normal incidence. Curve 70 includes band edge 70*a*. Curves 72,74 represent the effective reflectivity (as discussed above) of colored portions 16, 18 respectively. The overall spectral distributions of curves 72,74 represent similar colors. In this embodiment, at normal incidence the film 12 substantially transmits light from curves 72,74 to yield a high contrast appearance with a bright foreground colored portion 16 as depicted in FIG. 2. Indeed, at normal incidence the film 12 has the appearance of a substantially clear film, because it has high transmission throughout the visible spectrum.

For oblique angle observation, curve 70 with band edge 70*a* is replaced with a similar curve (not shown) shifted to shorter wavelengths by an amount dictated by the angle of observation. At at least some angles, the shifted transmission curve substantially blocks light associated with colored portions 16,18, except near one side of curves 72,74. The small amount of light that is transmitted has a similar apparent color and intensity, and the result is a low contrast appearance as depicted in FIG. 3.

In general, suitable articles 10 can include additional layers and features. For example, color shifting film 12 can include one or more regions that have been embossed with heat and/or pressure. The embossed regions are thinner than non-embossed neighboring regions and therefore have spectral transmission and reflection features that are blue-shifted relative to corresponding features of the non-embossed regions. The embossed regions can take the form of indicia in addition to the indicia 14 discussed above. As another example, the color shifting film 12 can contain or carry a microstructured relief pattern suitable for producing conventional holographic images. Such images can be used to further obscure the indicia 14 at selected geometries. The relief pattern can be formed using known holographic embossing techniques into a suitable skin layer or coating on top of the color shifting film. The relief pattern can alternately be incorporated into a separate transparent sheet that is laminated to the color shifting film. Reference is made generally to U.S. Pat. No. 5,656,360 (Faykish et al.). Such a separate transparent sheet is preferably polymeric for ease of manufacture and for article integrity over operating temperature ranges. As yet another example, additional graphics, symbols, or other indicia in addition to indicia 14 discussed above can be applied to the article 10 by conventional printing onto color shifting film 12 or onto additional layer(s) laminated to film 12.

EXAMPLE

A representative article was constructed using the following component materials: 3M brand Radiant Color Film CM590 for color shifting film 12; Seiko brand fluorescent orange dye (dye No. 503, made in Japan) for colored portion 16; and a conventional non-fluorescent orange/red dye (orange ink, made in Malaysia, available from BASF) for colored portion 18. The different dyes were applied by hand to one side (designated the "back"side) of the color shifting film in complementary fashion to form a foreground and background of a single letter "W", substantially as depicted in FIGS. 1 and 2 except that: (a) no adhesive layer 20 was used, and (b) portion 16 formed the background and portion 18 formed the foreground of the "W". The dyes were then allowed to dry. The resulting coated film was flexible and had an overall thickness of about: 1.8 mils (45 $\mu$m) for the film 12 by itself; 2.0 mils (50 $\mu$m) on average for the film plus dye in the foreground regions; and 2.4 mils (60 $\mu$m) on average for the film plus dye in the background regions. The thickness of the dried dyes was sufficient to render them substantially opaque if viewed against standard office lighting fixtures.

The article was placed back side down onto a sheet of white paper under ordinary office illumination. When viewed from the front at normal incidence, no fluorescence was detectable. Instead, the color seen was a blend of the reflected color of the color shifting film itself and the color of light transmitted by the color shifting film and reflected back through the film by the colored portions 16, 18. Since the fluorescent dye and non-fluorescent dye have substantially similar base colors, one sees only a slight contrast between the foreground letter "W" and the background.

At highly oblique observation angles (about 60 degrees or higher from the normal), the reflection band of the film 12 shifts sufficiently to make the background (colored portion 16) appear very bright orange. Under these conditions the foreground (colored portion 18) remained relatively dark in comparison to the fluorescent background.

Figure 8:
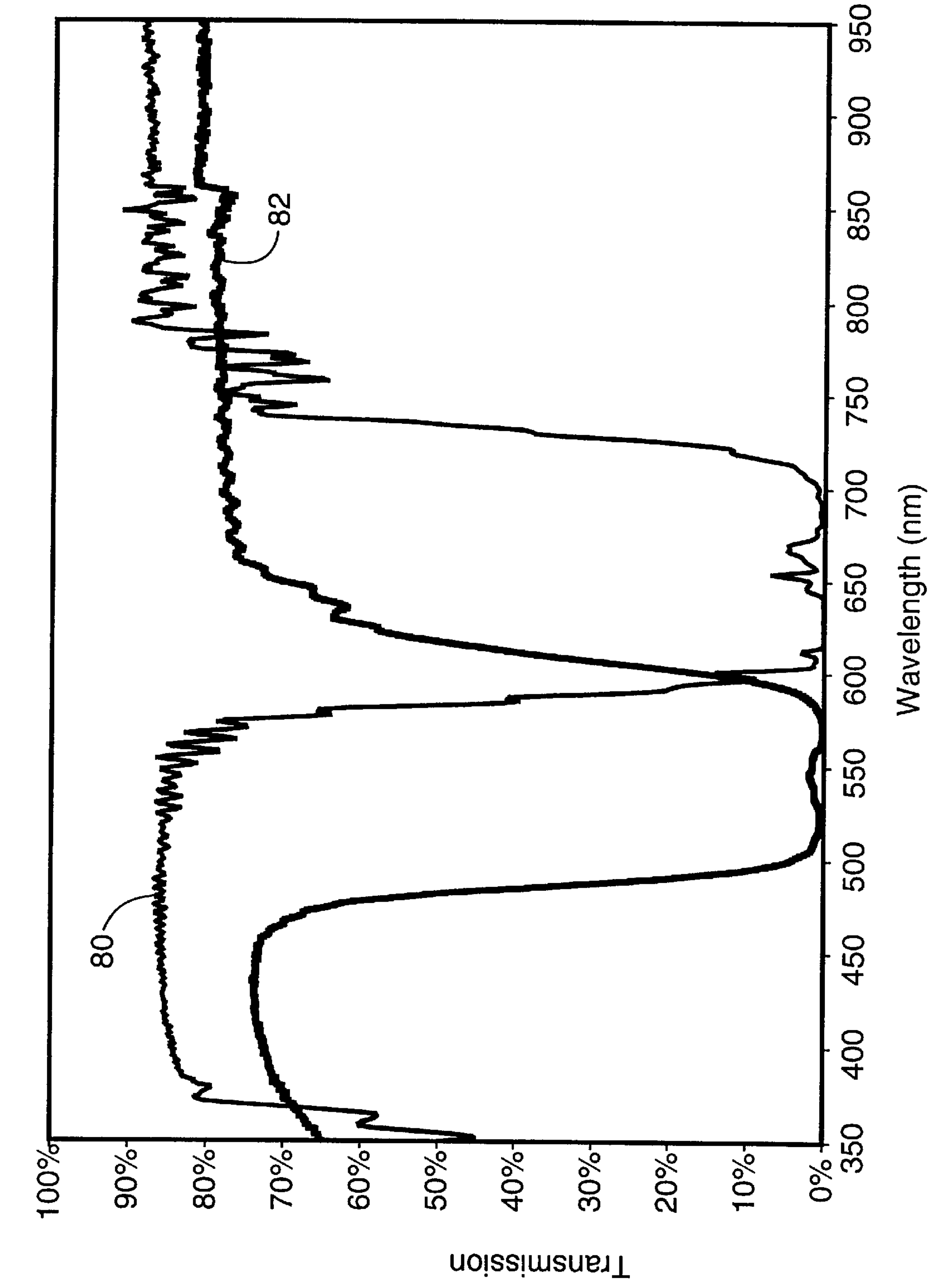
FIG. 8 is a graph of measured spectral transmission of a particular color shifting film at normal (0 degree) incidence and at 60 degrees incidence.
Figure 9:
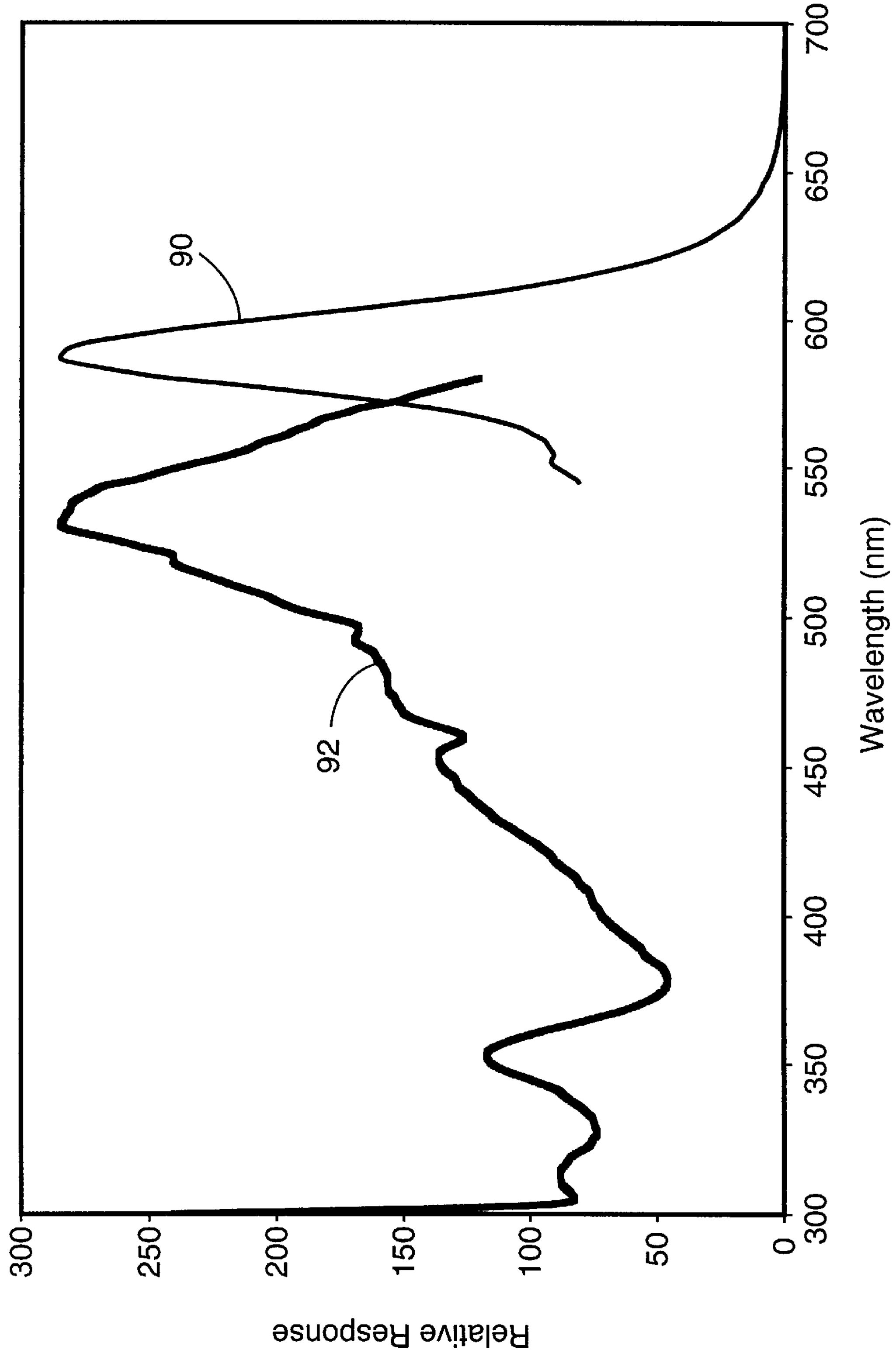
FIG. 9 is a graph of measured spectral properties of a particular orange fluorescent dye.
Figure 10:
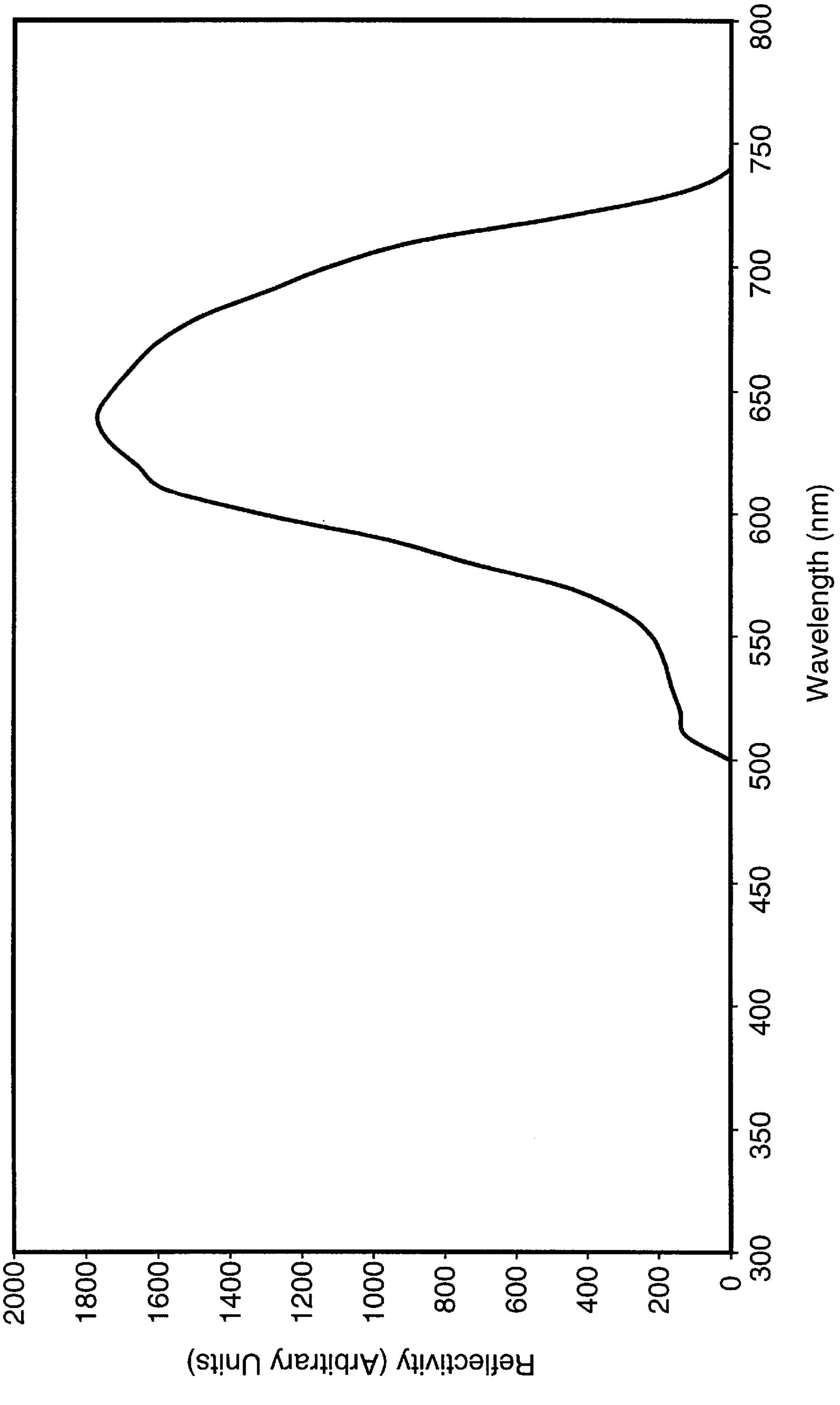
FIG. 10 is a graph of measured spectral reflectivity of a particular orange non-fluorescent colorant.

The transmission of a spare (uncoated) piece of the CM590; film was measured using a Perkin Elmer Lambda 19 RSA-PE19S spectrometer. FIG. 8 plots the measured percent transmission versus wavelength. Curve 80 was measured with unpolarized light at normal incidence to the film. Curve 82 is an average of p-polarized light and s-polarized light (i.e., light linearly polarized in the plane of incidence and perpendicular to the plane of incidence respectively) for an angle of 60 degrees from the normal direction. Note the wavelength shift of the reflection band and the good maintenance of the sharp band edges. FIG. 9 is data measured using a Perkin Elmer Model LSB50 Luminescence Spectrophotometer for the orange fluorescent dye. Curve 90 is the emission band and curve 92 is the excitation band for the dye. The two curves are plotted against relative response (in arbitrary units). Note that the excitation band 92 exists not only in the ultraviolet region but extends well into the visible region. In comparing FIGS. 8 and 9 note also that the CM590 film substantially transmits light in the excitation band 92 at normal angles and at oblique angles. FIG. 10 plots reflectivity of the non-fluorescent orange/red dye used in the example, as measured using an Ocean Optics Model SD2000 Spectrometer with a reflection probe. The y-axis plots reflectivity in arbitrary units which are not to scale compared to the arbitrary units used in FIG. 9.

All patents and patent applications referred to, including those disclosed in the background of the invention, are hereby incorporated by reference. The present invention has now been described with reference to several embodiments thereof. It will be apparent to those skilled in the art that many changes can be made in the embodiments described without departing from the scope of the invention. Thus, the scope of the present invention should not be limited to the preferred structures and methods described herein, but rather by the broad scope of the claims which follow.

What is claimed is:

1. An article, comprising:

a color shifting film; and indicia disposed behind the color shifting film;

wherein the indicia includes at least a first and second colored portion of substantially the same color and arranged as a foreground and a background of the indicia, wherein the first colored portion includes a first fluorescent colorant and the second colored portion is substantially non-fluorescent.

2. The article of claim 1, wherein the first fluorescent colorant has an emission band, and wherein the color shifting film substantially blocks transmission of light in the emission band at a first angle and substantially transmits light in the emission band at a second angle.

3. The article of claim 2, wherein the first and second colored portion have substantially the same color when viewed from a front surface of the color shifting film at the first angle.

4. The article of claim 1, wherein the first and second colored portion have substantially the same color when viewed through a substantially clear medium.

5. The article of claim 1, wherein at least the first colored portion is printed on the color shifting film.

6. The article of claim 1, wherein at least the second colored portion is printed on the color shifting film.

7. The article of claim 6, wherein the first colored portion is also printed on the color shifting film, and the second colored portion is printed substantially continuously to extend over the first colored portion.

8. The article of claim 1, further comprising an adhesive layer.

9. The article of claim 8, wherein the adhesive layer is disposed to permit attachment of the article to a substrate.

10. The article of claim 8, wherein the adhesive layer comprises one of the first and second colored portions.

11. The article of claim 1, wherein the foreground comprises the first colored portion and the background comprises the second colored portion.

12. The article of claim 1, wherein the background comprises the first colored portion and the foreground comprises the second colored portion.

13. The article of claim 1, wherein the color shifting film is selected from the group consisting of a polarizer and a mirror.

14. The article of claim 1, further comprising a substantially white diffuse surface disposed behind the indicia.

15. The article of claim 1, wherein the first fluorescent colorant has an excitation band, and wherein the color shifting film substantially blocks transmission of light in the excitation band at a first angle and substantially transmits light in the excitation band at a second angle.

16. The article of claim 1, further comprising additional indicia formed by at least one element selected from the group consisting of an embossed region of the color shifting film, a holographic element, and printed information.

* * * * *